United States Patent [19]
Hietala et al.

[11] Patent Number: 6,081,733
[45] Date of Patent: Jun. 27, 2000

[54] COMMUNICATION CONTROL APPARATUS AND METHOD

[75] Inventors: Alexander Wayne Hietala, Cary; Thomas Edward Oberhauser, Algonquin, both of Ill.

[73] Assignee: Motorola, Inc., Schaumburg, Ill.

[21] Appl. No.: 08/843,482

[22] Filed: Apr. 16, 1997

[51] Int. Cl.[7] .................................................. H04B 1/38
[52] U.S. Cl. ..................... 455/574; 455/38.3; 455/343
[58] Field of Search .................... 455/38.3, 343, 455/574, 127

[56] References Cited

U.S. PATENT DOCUMENTS

| | | |
|---|---|---|
| 4,449,248 | 5/1984 | Leslie et al. . |
| 4,509,199 | 4/1985 | Ichihara . |
| 4,513,430 | 4/1985 | Vora et al. . |
| 4,577,315 | 3/1986 | Otsuka . |
| 4,598,258 | 7/1986 | Babano . |
| 4,663,623 | 5/1987 | Lax et al. . |
| 4,679,244 | 7/1987 | Kawasaki et al. . |
| 4,903,319 | 2/1990 | Kasai et al. . |
| 4,977,611 | 12/1990 | Maru . |
| 5,140,698 | 8/1992 | Toko . |
| 5,175,874 | 12/1992 | Auchter . |
| 5,220,681 | 6/1993 | Belgin ................................. 455/343 |
| 5,291,542 | 3/1994 | Kivari et al. ....................... 455/574 |
| 5,378,935 | 1/1995 | Korhonen et al. . |
| 5,392,457 | 2/1995 | Davis et al. ........................ 455/38.3 |
| 5,416,435 | 5/1995 | Jokinen et al. . |
| 5,428,820 | 6/1995 | Okada et al. . |
| 5,487,181 | 1/1996 | Dailey et al. ....................... 455/574 |
| 5,594,951 | 1/1997 | Bellin ................................. 455/343 |
| 5,613,235 | 3/1997 | Kivari et al. . |
| 5,737,323 | 4/1998 | Lansdowne ........................ 455/38.3 |
| 5,790,941 | 8/1998 | Peponides .......................... 455/343 |
| 5,805,990 | 9/1998 | Ohki ................................... 455/343 |
| 5,806,006 | 8/1998 | Dinkins .............................. 455/574 |

FOREIGN PATENT DOCUMENTS

| | | |
|---|---|---|
| 0473465B1 | 3/1992 | European Pat. Off. . |
| 0678963A2 | 10/1995 | European Pat. Off. . |
| 0686902A2 | 12/1995 | European Pat. Off. . |
| 195 32 069 | 1/1997 | Germany . |
| 94/15298 | 7/1994 | WIPO . |

*Primary Examiner*—Dwayne D. Bost
*Assistant Examiner*—Quochien B. Vuong
*Attorney, Agent, or Firm*—Mark D. Patrick; Hisashi D. Watanabe

[57] ABSTRACT

A communication control apparatus (108) for use in an electronic device (102) includes a device (111), first and second communication lines (116 and 117), and a controller (110). The device (111) and the controller (110) are interconnected by the first and second communication lines (116 and 117), which are driven by the controller (110). The first and second communication lines (116 and 117) have different capacities and the first communication line (116) is subject to disabling. The controller (110) programs the device (111) using the first communication line (116) prior to its disabling and programs the device (111) via the second communication line (117) while the first communication line (116) is disabled. The apparatus (108) permits periodic placement of portions of the electronic device (102), including a master clock (112), into a powered-off state from which return to a powered-on state is possible.

20 Claims, 1 Drawing Sheet

COMMUNICATION CONTROL APPARATUS AND METHOD

FIELD OF THE INVENTION

The present invention relates generally to an electronic device and, more particularly, to communication control within the electronic device.

BACKGROUND OF THE INVENTION

Many electronic devices are powered by a battery. Those battery powered electronic devices that minimize power consumption and conserve battery power have a commercial advantage as they help extend the operating time of the electronic device. Accordingly, a significant amount of money and effort has been expended to reduce the amount of energy consumed by battery powered devices.

Radiotelephones are one type of battery powered electronic device. Radiotelephones, such as those operating in accordance with the time division multiple access (TDMA) standard, employ two modes of operation: a control mode and a communication mode. In an active state of the control mode, the radiotelephone intermittently receives paging information from a remote device while waiting to either place or receive a phone call and enter the communication mode. When the radiotelephone is not receiving paging information in the control mode (i.e., is idle), it enters a standby state in which portions of the radiotelephone are placed in a powered-off state to reduce power consumption.

One portion of a radiotelephone that is typically not placed in a powered-off state is the master clock. The master clock provides a high speed timing reference used by a controller in a radiotelephone to communicate programming over a high capacity bus to other integrated circuits in the radiotelephone. Placing the master clock in a powered-off state disables such programming and, in practicality, disables the radiotelephone. When the master clock is off, the controller can not communicate programming to the other integrated circuits to, for example, return to a powered-on state when exiting the standby state.

On the other hand, one skilled in the art will recognize that the master clock is a significant source of power consumption. For example, a system clock running at 13 MHz can draw as much as 1 mA of current during each idle period when no paging information is being received. Therefore, to maximize reduction of power consumption, what is needed is an apparatus for, and method of, communication control in an electronic device that permits periodical powering off of circuitry, such as the master clock.

BRIEF DESCRIPTION OF THE DRAWING

The FIGURE is a partial block diagram and partial schematic diagram illustrating a communication system employing an electronic device utilizing a communication control apparatus.

DETAILED DESCRIPTION OF THE PREFERRED EMBODIMENTS

Figure 1:
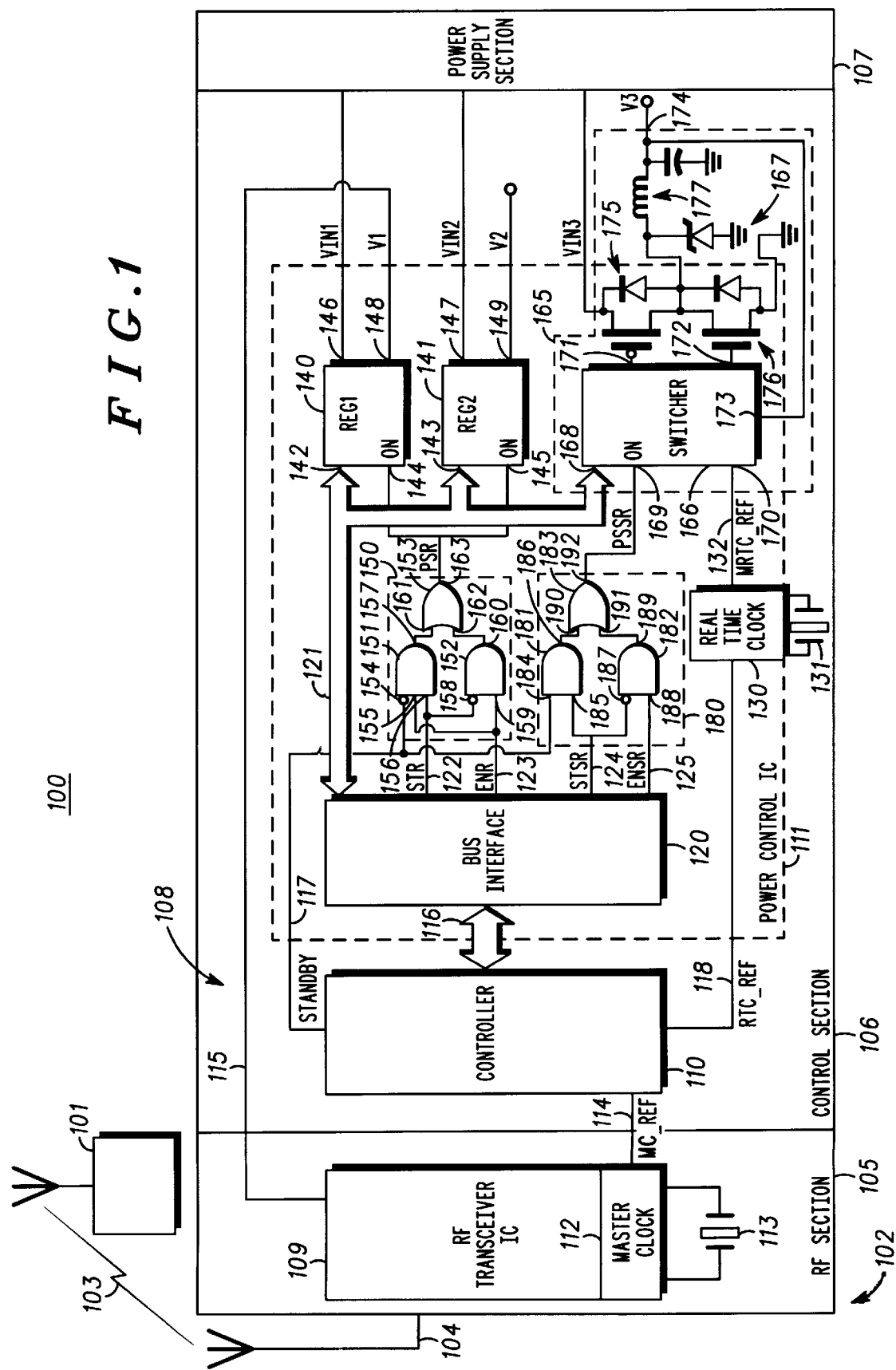

A communication control apparatus for use in an electronic device includes a device, first and second communication lines, and a controller. The device, which may be an integrated circuit (IC), and the controller are interconnected by the first and second communication lines, which are driven by the controller. The first and second communication lines have different capacities and the first communication line is subject to disabling. The controller programs the device using the first communication line prior to its disabling and programs the device via the second communication line while the first communication line is disabled. By employing such an arrangement of communication lines, the communication control apparatus is capable of periodically placing portions of the electronic device, including the master clock, into a powered-off state from which return to a powered-on state is feasible.

A communication system 100, shown in the FIGURE, comprises remote and local communication devices 101 and 102 that communicate via a communication link 103. In the illustrated embodiment, the remote and local devices 101 and 102 are a base station and a radiotelephone, respectively, and the link 103 comprises radio frequency (RF) signals. The local device 102 includes an antenna 104, an RF section 105, a control section 106, and a power supply section 107, which preferably comprises one or more batteries to supply power to the local device 102. In the active state of the control mode and the communication mode of the local device 102, the RF signals of the link 103 are received at the antenna 104 and converted by the RF section 105 into receive data and audio signals for processing by the control section 106, and transmit data and audio signals generated in the control section 106 are converted by the RF section 105 into RF transmit signals for emission by the antenna 104 as the RF signals of the link 103. In the standby state of the control mode of the local device 102, portions of the control section 106 and the RF section 105 are placed in a powered-down or powered-off state to reduce power consumption.

The local device 102 includes a communication control apparatus 108. The communication control apparatus 108 includes an RF transceiver IC 109 of the RF section 105, a controller 110 of the control section 106, and a power control IC 111 of the control section 106. The RF transceiver IC 109 generates synthesized frequencies for use in transmission and reception of the RF signals of the link 103. The RF transceiver IC 109 includes a master clock 112 fed by an externally coupled crystal 113. The master clock 112 is a high speed clock that generates a master clock reference MC_REF on a line 114, which is coupled to the controller 110. In the illustrated embodiment, the master clock reference MC_REF generated by the master clock 112 is a 13 MHz clock signal. The RF transceiver IC 109, including the master clock 112, is supplied power, and placed in a powered-on or powered-off state, by the power control IC 111 via a supply line 115. Although shown in the FIGURE to be contained in the RF transceiver IC 109, one skilled in the art will recognize that the master clock 112 and the crystal 113 could alternatively be implemented in a stand-alone reference oscillator circuit supplied by the power control IC 111. The RF transceiver IC 109 is preferably an application specific IC (ASIC) device, but may alternatively be implemented by suitable discrete devices.

The controller 110 communicates programming to control operation of the local device 102. The controller 110 is preferably a programmed microcontroller device, such as the 68338 microcontroller manufactured and sold by Motorola, Inc., but may alternatively be implemented by other suitable microprocessor or ASIC devices. The controller 110 communicates programming by driving multiple communication lines, which include a bus 116 and a control line 117. The controller 110 drives the bus 116 and the control line 117 at a rate set by, or derived from, the master clock reference MC_REF received via the line 114. The bus 116 is a high capacity communication line suitable for communicating a relatively large amount of programming to ICs or other devices at a high speed. In the illustrated embodiment, the bus 116 is a multiple line bus with a capacity of 3 Mbits/sec. that supports Serial Programming Interface (SPI) programming, such as that employed in radiotelephones manufactured and sold by Motorola, Inc. One skilled in the art will recognize that the bus 116 could alternatively be a parallel bus. The bus 116 becomes disabled and can not used for communicating programming when the master clock 112 is placed in a powered-off state and the master clock reference MC_REF is not present on the line 114 for use by the controller 110.

The control line 117 is a low capacity communication line suitable for communicating a relatively small amount of programming at a low speed. In the illustrated embodiment, the control line 117 is a dedicated single line for a standby control signal STANDBY. The standby control signal STANDBY has a logic high level or a logic low level as programmed by the controller 110. When the RF transceiver IC 109 is placed in the powered-off state and the master clock reference MC_REF is not present on the line 114, the controller 110 executes programming of the standby control signal STANDBY via the control line 117 at a rate set by, or derived from, a real time clock reference RTC_REF received from the power control IC 111 via a line 118.

The power control IC 111 generally provides regulator functions to the local device 102. The power control IC 111 includes a bus interface 120, a real time clock circuit 130, regulators 140 and 141, a regulator control circuit 150, switching regulator circuitry 165, and a switching regulator control circuit 180. The power control IC 111 is preferably an ASIC device, but may alternatively be implemented by suitable discrete devices.

The bus interface 120 is coupled to the bus 116 to receive programming for the power control IC 111. The bus interface 120 outputs the programming received via the bus 116' on bus 121 and lines 122, 123, 124, and 125 internal to the power control IC 111. In the illustrated embodiment, the bus 121 is substantially similar to the bus 116 and the lines 122, 123, 124, and 125 are dedicated single lines for a regulator standby signal STR, a regulator enable signal ENR, a switching regulator standby signal STSR, and a switching regulator enable signal ENSR, respectively. Each of the signals STR, ENR, STSR, and ENSR is programmed to have a logic high level or a logic low level. The bus interface 120 is a serial interface, a parallel interface, or other interface that is compatible with the bus 116.

The real time clock circuit 130 supplies the real time clock reference RTC_REF on the line 118 and a multiplied real time clock reference MRTC_REF on a line 132. The real time clock 130 is fed by a crystal 131, which is externally coupled to the power control IC 111. The crystal 131 is preferably a low-cost crystal, such as that used in a wristwatch. The real time clock circuit 130 is preferably powered by a dedicated rechargeable coin cell battery (not shown) of the power supply section 107. In the illustrated embodiment, the real time clock reference RTC_REF is a 32 kHz clock signal and the frequency of the multiplied real time clock reference MRTC_REF is approximately eight times that of the real time clock reference RTC_REF.

The regulators 140 and 141 are linear regulators fed by the power supply section 107. The regulators 140 and 141 include respective programming ports 142 and 143 coupled to the bus 121, respective ON ports 144 and 145 coupled to the regulator control circuit 150, respective supply ports 146 and 147 coupled to the power supply section 107, and respective output ports 148 and 149. The regulators 140 and 141 enter a powered-on state when a logic high level is present at the ON ports 144 and 145. In the powered-on state, the regulators 140 and 141 are configured by programming received at the programming ports 142 and 143. Once configured, the regulators 140 and 141 translate input voltages VIN1 and VIN2 present at the supply ports 146 and 147 into regulated voltages V1 and V2 at the output ports 148 and 149. The regulated voltage V1 is coupled to the supply line 115 to provide power sufficient to place the RF transceiver IC 109, and the master clock 112 therein, in the powered-on state. The regulated voltage V2 provides an additional supply to power other circuitry of the local device 102. The regulators 140 and 141 enter a powered-off state when a logic low level is present at the ON ports 144 and 145. In the powered-off state, the regulators 140 and 141 are disabled and do not supply the regulated voltages V1 and V2. In this state, the RF transceiver IC 109, and the master clock 112 therein, are placed in a powered-off state.

The regulator control circuit 150 is coupled to the regulators 140 and 141, the control line 117, and the lines 122 and 123 to selectively place the regulators 140 and 141 in a powered-on state or powered-off state. The regulator control circuit 150 has a plurality of logic gates, which include AND gates 151 and 152 and an OR gate 153. The AND gate 151 has an inverted input port 154 coupled to the control line 117 to receive a complement of the standby control signal STANDBY, an input port 155 coupled to the line 123 to receive the regulator enable signal ENR, an input port 156 coupled to the line 122 to receive the regulator standby signal STR, and an output port 157. The AND gate 152 has an inverted input port 158 coupled to the line 122 to receive a complement of the regulator standby signal STR, an input port 159 coupled to the line 123 to receive the regulator enable signal ENR, and an output port 160. The OR gate 153 has input ports 161 and 162 coupled to the output ports 157 and 160 of the AND gates 151 and 152, respectively, and an output port 163 coupled to the ON ports 144 and 145 of the regulators 140 and 141 to provide a regulator power state signal PSR thereto.

The regulator control circuit 150 is defined by the following equation:

$$PSR = STANDBY \cdot ENR \cdot STR + STR \cdot ENR \qquad (1).$$

Equation (1) states that the regulator power state signal PSR will have a logic high level when the regulator enable signal ENR has a logic high level and either the regulator standby signal STR has a logic low level or the standby control signal STANDBY has a logic low level and the regulator standby signal STR has a logic high level. Otherwise, the regulator power state signal PSR will have a logic low level.

The regulator control circuit 150 is configurable to operate in one of two modes. A first mode is preferably employed during the control mode of the local device 102. In the first mode, the AND gate 151 of the regulator control circuit 150 primarily facilitates control of the regulators 140 and 141. Upon entering the active state of the control mode, the regulators 140 and 141 are activated by the controller 110, which communicates programming to the regulator control circuit 150 via the control line 117 that sets the standby control signal STANDBY to a logic low level and via a path defined by the bus 116, the bus interface 120, and the lines 122 and 123 that sets both the regulator standby signal STR and the regulator enable signal ENR to a logic high level, respectively. This sets the regulator power state signal PSR to a logic high level.

When transitioning from the active state to the standby state of the control mode, the controller 110, at the rate set by the master clock reference MC_REF, sets the standby control signal STANDBY on the control line 117 to a logic high level. The regulator power state signal PSR goes to a logic low level and places the regulators 140 and 141, as well as the RF transceiver IC 109 and the master clock 112 powered therefrom, in a powered-off state. With the master clock 112 powered-off, the controller 110 can no longer communicate programming via the bus 116 at a high capacity.

When transitioning from the standby state to the active state, the controller 110, at a rate set by the real time clock reference RTC_REF, sets the standby control signal STANDBY on the control line 117 to a logic low level. The regulator power state signal PSR goes to a logic high level and places the regulators 140 and 141 and the RF transceiver IC 109 in a powered-on state. The master clock 112 is restarted and programming via the bus 116 at a high capacity is enabled. Thus, by employing the control line 117 in conjunction with the regulator control circuit 150, the regulators 140 and 141 and the RF transceiver IC 109, including the master clock 112, can be periodically placed in a powered-off state to reduce power consumption without detrimental effects to the operation of the local device 102.

If it is desired to operate independently of the standby control signal STANDBY, such as during the communication mode of the local device, the regulator control circuit 150 employs a second mode of operation. In the second mode, the AND gate 152 facilitates control of the regulators 140 and 141. In this mode, the regulators 140 and 141 are placed in the powered-on state when the controller 110 sets the regulator power state signal PSR to a logic high level by programming the regulator enable signal ENR to a logic high level and the regulator standby signal STR to a logic low level via the bus 116, the bus interface 120, and the lines 122 and 123. The regulators are placed in a powered-off state when the controller 110 sets the regulator power state signal PSR to a logic low level by programming the regulator enable signal ENR to a logic low level and the regulator standby signal STR to a logic low level.

The dual communication path of the bus 116 and the control line 117 may also be advantageously employed in conjunction with the switching regulator circuitry 165. The switching regulator circuitry 165 includes a switcher 166, a synchronous rectifier 167, a p-channel Metal-Oxide-Semiconductor Field-Effect Transistor (MOSFET) 175, and a Schottky diode, inductor, capacitor network 177. The switcher 166, the MOSFET 175, and the Schottky diode, inductor, capacitor network 177 collectively comprise a switching regulator. The switcher 166 has a programming port 168 coupled to the bus 121, a clock port 170 coupled to the line 132, a control port 171 coupled to the MOSFET 175, a control port 172 coupled to the synchronous rectifier 167, and a feedback port 173 coupled to an output port 174 of the switching regulator circuitry 165. The synchronous rectifier 167 comprises an n-channel MOSFET 176 having a gate coupled to the control port 172, a drain coupled to the MOSFET 175, and a source coupled to an electrical ground external to the power control IC 111. The p-channel MOSFET 175 has a gate coupled to the control port 171, a drain coupled to the power supply section 107 to receive input voltage VIN3, and a source coupled to the drain of the MOSFET 175. The Schottky diode, inductor, capacitor network 177, which is external to the power control IC 111, is coupled between the source-drain connection of the MOSFETs 175 and 176 and the output port 174 of the switching regulator circuitry 165.

The switcher 166, responsive to programming at the programming port 168, operates the switching regulator circuitry 165 in a normal (buck) mode. In the normal mode, the switcher 166 runs the synchronous rectifier 167 by driving the MOSFETs 175 and 176 to alternately conduct at the rate of the multiplied real time clock reference MRTC_REF received at the clock port 170. This in turn causes the output voltage V3 to be equal to the input voltage VIN3 multiplied by the duty cycle of a control signal present at the control port 171. In response to the regulated output voltage V3 received at the feedback port 173, the switcher 166 adjusts the duty cycle at the control port 171 to obtain a desired voltage level of the output voltage V3. The switcher 166 continuously runs the synchronous rectifier 167 to improve efficiency at higher current levels and to prevent the switching regulator circuitry 165 from skipping pulses and outputting spurious energy into the audio band. Such spurious energy interferes with the audio signals received and transmitted during the communication mode of the local device 102.

When the local device 102 is in the standby state, the synchronous rectifier 167 need not be run because no audio signals are being received or transmitted and, thus, there is nothing for the spurious energy to interfere with. To further minimize power consumption in the standby mode, the switcher 166 includes an ON port 169 coupled to the switching regulator control circuit 180. The switcher 166 continuously runs the synchronous rectifier 167 when a logic low level is present at the ON port 169. The switcher 166 halts running of the synchronous rectifier 167 when a logic high level is present at the ON port 169.

The switching regulator control circuit 180 is coupled to the switching regulator circuitry 165, the control line 117, and the lines 124 and 125 to selectively run the synchronous rectifier 167 in the normal mode. The switching regulator control circuit 180 has a plurality of logic gates, which include AND gates 181 and 182 and an OR gate 183. The AND gate 181 has an input port 184 coupled to the control line 117 to receive the standby control signal STANDBY, an input port 185 coupled to the line 124 to receive the switching regulator standby signal STSR, and an output port 186. The AND gate 182 has an inverted input port 187 coupled to the line 124 to receive a complement of the switching regulator standby signal STSR, an input port 188 coupled to the line 125 to receive the switching regulator enable signal ENSR, and an output port 189. The OR gate 183 has input ports 190 and 191 coupled to the output ports 186 and 189 of the AND gates 181 and 182, respectively, and an output port 192 coupled to the ON port 169 of the switcher 166 to provide a switching regulator power state signal PSSR thereto.

The switching regulator control circuit 180 is defined by the following equation:

$$PSSR = STANDBY \cdot STSR + ENSR \cdot \overline{STSR} \qquad (2).$$

Equation (2) indicates that the switching regulator power state signal PSSR will have a logic high level when the standby control signal STANDBY has a logic high level and the regulator standby signal STSR has a logic high level or the switching regulator enable signal ENSR has a logic high level and the switching regulator standby signal STSR has a logic low level. Otherwise, the switching regulator power state signal PSSR will have a logic low level.

The switching regulator control circuit 180 is configurable to operate in one of two modes. In a first mode, which is preferably employed during the control mode of the local device 102, the AND gate 181 facilitates control of the switching regulator circuitry 165. The controller 110 communicates programming to the switching regulator control circuit 180 via the control line 117 that sets the standby control signal STANDBY to a logic low level and via a path defined by the bus 116, the bus interface 120, and the line 124 that sets the switching regulator standby signal STSR to a logic high level. This sets the switching regulator power state signal PSSR to a logic low level, which places the synchronous rectifier 167 in a powered-on state and allows the synchronous rectifier 167 to run. When the controller 110 sets the standby control signal STANDBY on the control line 117 to a logic high level to enter the standby state, in the manner previously described, the switching regulator power state signal PSSR goes to a logic high level. This places the synchronous rectifier 167 in a powered-off state and allows pulse skipping. When the controller 110 sets the standby control signal STANDBY on the control line 117 to a logic low level to exit the standby state, in the manner previously described, the switching regulator power state signal PSSR goes to a logic high level and the synchronous rectifier 167 runs. Thus, by employing the control line 117 in conjunction with the switching regulator control circuit 180, the synchronous rectifier 167 can be periodically placed in a powered-off state to reduce power consumption without detrimental effects to the operation of the local device 102.

If it is desired to operate independently of the standby control signal STANDBY, such as during the communication mode of the local device, the switching regulator control circuit 180 employs a second mode of operation. In the second mode, the AND gate 182 facilitates control of the switching regulator circuitry 165. In this mode, the synchronous rectifier 167 is placed in a powered-off state when the controller 110 sets the switching regulator power state signal PSSR to a logic high level by programming the switching regulator enable signal ENR to a logic high level and the switching regulator standby signal STR to a logic low level via the bus 116, the bus interface 120, and the lines 124 and 125. The synchronous rectifier 167 is placed in a powered-on state to run when the controller 110 sets the switching regulator power state signal PSSR to a logic low level by programming the switching regulator enable signal ENR to a logic low level and the switching regulator standby signal STR to a logic low level.

Thus, it may be seen that by communicating programming on a low capacity line when a high capacity line becomes disabled, a communication control apparatus can enhance power conservation of an electronic device. Portions of an electronic device, including one or more regulators, a master clock, and a synchronous rectifier, can be placed into a powered-off state from which return to a powered-on state is possible without interruption to the operation of the electronic device.

What is claimed is:

1. A communication control apparatus comprising:
    a device;
    a first communication line for communicating information, the first communication line coupled to the device and having a first capacity, an enabled state and a disabled state, the first communication line, in the disabled state, not usable to communicate information, the first communication line being a bus;
    a second communication line for communicating information, the second communication line coupled to the device and having a second capacity different from the first capacity; and
    a controller to drive the first and second communication lines, the controller to program the device via the first communication line when the first communication line is in the enabled state, and the controller to program the device via the second communication line while the first communication line is in the disabled state.

2. An apparatus according to claim 1 wherein
    the first communication line is a multiple line bus, and
    the second communication line is a single line.

3. An apparatus according to claim 1 wherein the device comprises a regulator.

4. An apparatus according to claim 3 wherein the device further comprises a regulator control circuit coupled to the regulator, the first communication line, and the second communication line, the regulator control circuit, in response to programming on the first and second communication lines, to place the regulator in a powered-off state, and the regulator control circuit, in response to programming via the second communication line, to place the regulator in a powered-on state.

5. An apparatus according to claim 3 further comprising a first clock coupled to the controller and the regulator, the first clock supplied power by the regulator.

6. An apparatus according to claim 5 further comprising a second clock coupled to the controller.

7. An apparatus according to claim 6 wherein
    the regulator is coupled to the first and second communication lines, and
    the controller communicates programming on the first and second communication lines at a rate set by the first clock to place the first clock in a powered-off state, and, thereafter, the controller communicates programming on the second communication line at a rate set by the second clock to place the first clock in a powered-on state.

8. An apparatus according to claim 1 further comprising
    a first crystal; and
    a master clock coupled to the device and the controller, the master clock fed by the first crystal and powered by the device.

9. An apparatus according to claim 8 wherein the controller communicates programming on the first and second communication lines at a rate set by the first clock to power-off the master clock, and, thereafter, the controller communicates programming on the second communication line to power-on the master clock.

10. An apparatus according to claim 1 wherein the device comprises switching regulator circuitry having a synchronous rectifier.

11. An apparatus according to claim 10 wherein the device further comprises a switching regulator control circuit coupled to the switching regulator circuitry, the first communication line, and the second communication line, the switching regulator control circuit, in response to programming on the first and second communication lines, to place the synchronous rectifier in a powered-off state, and the switching regulator control circuit, in response to programming via the second communication line, to place the synchronous rectifier in a powered-on state.

12. A communication control apparatus comprising:
    a device;
    a first communication line coupled to the device, the first communication line having a first capacity and being subject to disabling;
    a second communication line coupled to the device, the second communication line having a second capacity different from the first capacity; and
    a controller to drive the first and second communication lines, the controller to program the device via the first communication line prior to disabling of the first communication line, and the controller to program the device via the second communication line while the first communication line is disabled;

wherein the device comprises a regulator and a regulator control circuit coupled to the regulator, the first communication line, and the second communication line, the regulator control circuit comprising first and second AND gates and an OR gate, the first AND gate having first, second, and third inputs and a first output, the first input being inverted and coupled to the second communication line, the second input coupled to the first communication line to receive a standby signal, the third input coupled to the first communication line to receive an enable signal, the second AND gate having fourth and fifth inputs and a second output, the fourth input being inverted and coupled to the third input, the fifth input coupled to the second input, the OR gate having sixth and seventh inputs and a third output, the sixth input coupled to the first output, the seventh input coupled to the second output, and the third output coupled to the first regulator, the regulator control circuit, in response to programming on the first and second communication lines, to place the regulator in a powered-off state, and the regulator control circuit, in response to programming via the second communication line, to place the regulator in a powered-on state.

13. A communication control apparatus comprising:
a device:
a first crystal:
a second crystal;
a first communication line for communicating information, the first communication line coupled to the device and having a first capacity, an enabled state and a disabled state, the first communication line, in the disabled state, not usable to communicate information;
a second communication line for communicating information, the second communication line coupled to the device and having a second capacity different from the first capacity;
a controller to drive the first and second communication lines, the controller to program the device via the first communication line when the first communication line is in the enabled state, and the controller to program the device via the second communication line while the first communication line is in the disabled state;
a master clock coupled to the device and the controller, the master clock fed by the first crystal and powered by the device; and
a second clock coupled to the controller and fed by the second crystal.

14. An apparatus according to claim 13 wherein the controller communicates programming on the first and second communication lines at a first rate set by the master clock to place the master clock in a powered-off state, and, thereafter, the controller communicates programming on the second communication line at a second rate set by the second clock to place the master clock in a powered-on state, the first rate greater than the second rate.

15. A communication control apparatus comprising:
a device;
a first communication line coupled to the device, the first communication line having a first capacity and being subject to disabling;
a second communication line coupled to the device, the second communication line having a second capacity different from the first capacity; and a controller to drive the first and second communication lines, the controller to program the device via the first communication line prior to disabling of the first communication line, and the controller to program the device via the second communication line while the first communication line is disabled;

wherein the device comprises switching regulator circuitry having a synchronous rectifier and a switching regulator control circuit coupled to the switching regulator circuitry, the first communication line, and the second communication line, the switching regulator control circuit comprising first and second AND gates and an OR gate, the first AND gate having first and second inputs and a first output, the first input coupled to the second communication line, the second input coupled to the first communication line to receive a standby signal, the second AND gate having third and fourth inputs and a second output, the third input being inverted and coupled to the second input, the fourth input coupled to the first communication line to receive an enable signal, the OR gate having fifth and sixth inputs and a third output, the fifth input coupled to the first output, the sixth input coupled to the second output, and the third output coupled to the switching regulator circuitry, the switching regulator control circuit, in response to programming on the first and second communication lines, to place the synchronous rectifier in a powered-off state, and the switching regulator control circuit, in response to programming via the second communication line, to place the synchronous rectifier in a powered-on state.

16. A communication control apparatus comprising:
a real time clock for providing a low speed timing reference;
a master clock for providing a high speed timing reference;
a regulator to power the master clock;
a regulator control circuit coupled to the regulator and to selectively power the regulator in response to programming;
a bus coupled to the regulator control circuit;
a control line coupled to the regulator control circuit; and
a controller coupled to the master clock, the real time clock, the bus, and the control line, the controller to operate the apparatus in one of an active state and a standby state, the controller, when transitioning from the active state to the standby state, communicating programming on the control line and the bus at a rate set by the high speed timing reference of the master clock to control the regulator control circuit to power off the regulator and place the master clock in a powered-off state, the controller, when transitioning from the standby state to the active state, communicating programming on the control line at a rate set by the low speed timing reference of the real time clock to control the regulator control circuit to power on the regulator and place the master clock in a powered-on state, thereby minimizing power consumption by the master clock in the standby state.

17. An electronic device comprising:
an antenna;
a radio frequency (RF) section coupled to the antenna, the RF section comprising an RF transceiver integrated circuit (IC) and a first crystal, the RF transceiver IC comprising a high speed clock fed by the first crystal;

a power supply section; and a control section coupled to the power supply section and the RF section, the control section comprising a controller, a second crystal, a power control IC having a low speed clock fed by the second crystal, a multiple line bus, and a standby control line, the controller coupled to the high speed clock, the low speed clock, the multiple line bus, and the standby control line, the power control IC coupled to the RF transceiver IC, the multiple line bus, and the standby control line, the controller to control the electronic device in one of an active state and a standby state, the controller, when transitioning from the active state to the standby state, communicating programming on the multiple line bus and the standby control line at a rate set by the high speed clock to place the RF transceiver IC in a powered-off state, the controller, when transitioning from the standby state to the active state, communicating programming on the standby control line at a rate set by the low speed clock to place the RF transceiver IC in a powered-on state, thereby minimizing power consumption by the high speed clock in the standby state.

18. A communication control method comprising the steps of:

communicating on a first communication line having a first capacity, the first communication line being a bus;

disabling the first communication line to prevent communication thereon; and communicating, while the first communication line is disabled, on a second communication line having a second capacity differing from the first capacity.

19. A communication control method comprising:

communicating on a first communication line at a first rate set by a first clock, the first communication line having a first capacity;

disabling the first communication line to prevent communication thereon; and communicating, while the first communication line is disabled, on a second communication line at a second rate set by a second clock, the second rate differing from the first rate, the second communication line having a second capacity differing from the first capacity.

20. A method according to claim 19 wherein said step of disabling comprises the substep of powering off the first clock.

* * * * *